United States Patent
Whitehead

[19]

[11] Patent Number: 5,949,591
[45] Date of Patent: Sep. 7, 1999

[54] EXTERIOR REARVIEW MIRROR ASSEMBLY FOR VEHICLES WITH POSITIONING DETENTS

[75] Inventor: Peter J. Whitehead, Holland, Mich.

[73] Assignee: Donnelly Corporation, Holland, Mich.

[21] Appl. No.: 08/995,169

[22] Filed: Dec. 19, 1997

[51] Int. Cl.[6] ...................................................... G02B 5/08
[52] U.S. Cl. .......................... 359/841; 359/872; 248/478; 248/479; 248/900
[58] Field of Search ..................................... 359/841, 872; 248/549, 478, 479, 900

[56] References Cited

U.S. PATENT DOCUMENTS

| D. 250,702 | 1/1979 | VandenBrink et al. | D12/187 |
|---|---|---|---|
| 4,135,694 | 1/1979 | Stegenga et al. | 248/478 |
| 4,692,000 | 9/1987 | Wada et al. | 359/841 |
| 5,557,476 | 9/1996 | Oishi | 359/841 |
| 5,669,698 | 9/1997 | Veldman et al. | 362/83.1 |
| 5,669,705 | 9/1997 | Pastrick et al. | 362/83.1 |

*Primary Examiner*—Cassandra Spyrou
*Assistant Examiner*—Euncha Cherry
*Attorney, Agent, or Firm*—Van Dkye, Gardner, Linn & Burkhart, LLP

[57] ABSTRACT

A vehicle exterior rearview mirror assembly provides a break-away housing which exhibits increased dampening, reduce vibration, and consistent break-away force while requiring simplified tooling to manufacture. The mirror assembly includes a housing having a reflective element supported and a mounting bracket adapted for mounting to a vehicle. The mounting bracket includes a pivot extending between the mounting bracket and the housing, for pivotally mounting the housing to the mounting bracket. The mounting bracket and housing include a plurality of detent assemblies for releasably coupling the housing to the mounting bracket. At least two detent assemblies have a longitudinal extent which is substantially parallel to a line which extends through a center of rotation of the pivot. Preferably, the at least two detent assemblies are positioned on opposite sides of the pivot and are positioned on opposed sides of mounting bracket. Preferably, the detent assemblies each comprises a recess positioned on one of the mounting bracket and the housing and a projecting member provided on the other of the mounting bracket and the housing.

34 Claims, 3 Drawing Sheets

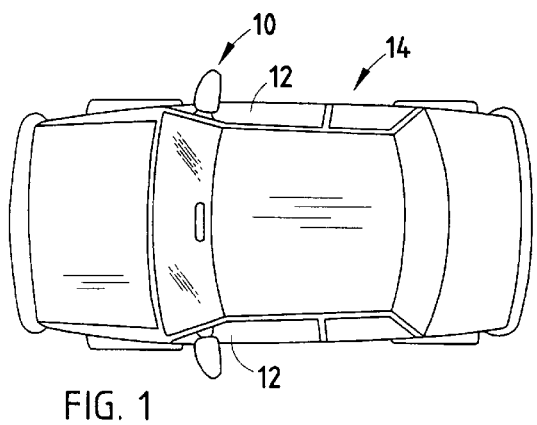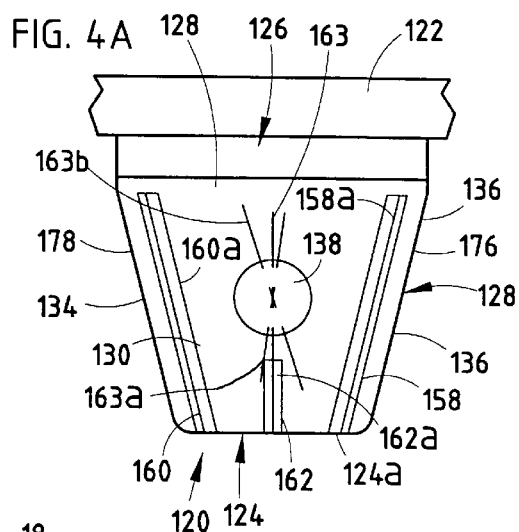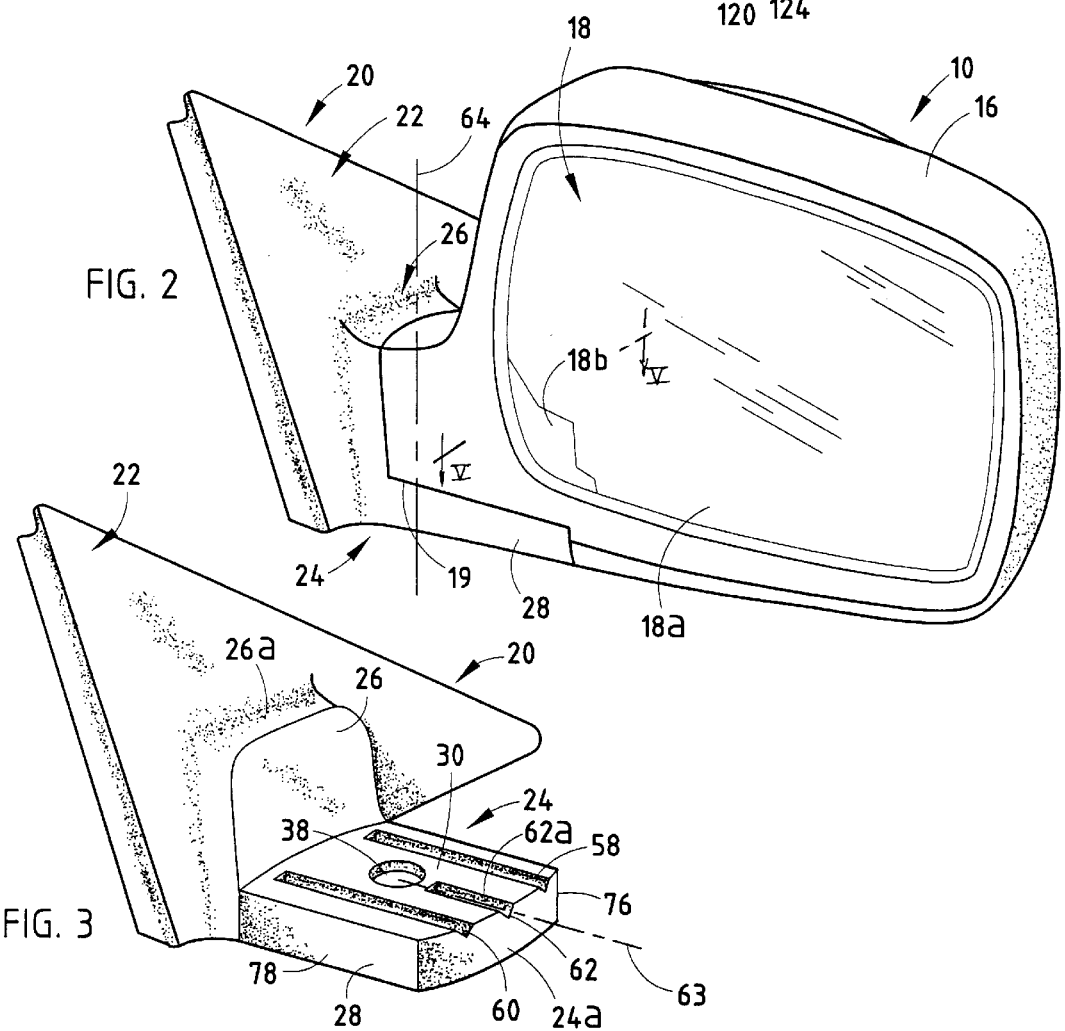

EXTERIOR REARVIEW MIRROR ASSEMBLY FOR VEHICLES WITH POSITIONING DETENTS

TECHNICAL FIELD AND BACKGROUND OF THE INVENTION

The present invention relates to an exterior rearview mirror assembly for mounting on a vehicle and, more particularly, to a break-away exterior rearview mirror assembly which moves between a normal operating position and a folded retracted position against the body of the vehicle when an external force is applied to the housing.

In most current vehicles, a typical exterior rearview mirror assembly includes a modular housing with a reflective element supported in the modular housing. The housing is supported on the vehicle or vehicle panel by a mounting bracket. To minimize the damage to the exterior rearview mirror assembly in the event of an impact with the mirror housing, auto manufacturers have designed mirror assemblies that fold or break-away about the mounting bracket under such an impact. This is achieved by pivotally mounting the modular housing to the mounting bracket on a pivot bushing and providing a plurality of radially extending detent assemblies which are formed on the mounting bracket and the housing. These detent assemblies releasably couple the housing to the mounting bracket under normal loading conditions but release the housing and permit the housing to pivot on the mounting bracket when the mirror housing is impacted by a force of sufficient magnitude.

Referring to FIG. 7, a conventional mounting bracket is shown. The mounting bracket includes a plurality of radially extending recesses or grooves, which cooperate with similarly arranged projections provided on the housing of the mirror assembly. The recesses are positioned around a central opening in the base of the mounting bracket which receives a pivot member or bushing. The projections are urged into engagement with the recesses on the mounting bracket by a spring, which is supported by the pivot member. In order to pivot the housing on the bracket and disengage the projections from the recesses provided on the mounting bracket, a force is required which has a sufficient magnitude to compress the spring and move the projections out of the corresponding recesses.

However, it is has been found that these conventional break-away devices tend to reduce the vibration performance of the exterior rearview mirror assembly. The detent assemblies are located around the medial portion of the mounting bracket, which is subject to maximum deflections. This allows movement and folding of the assembly with an undesirably low or inconsistent force. Furthermore, since the medial portion of the bracket is difficult to reinforce, the overall stiffness of the joint or connection is reduced. Therefore, the exterior rearview mirror exhibits increased vibration, resulting in reduced dampening performance. Moreover, the molding process for these conventional breakaway mirror assemblies requires a separate molding step for the recesses and ribs, since they are not aligned with the line of draw of the tooling.

Consequently there is a need for a break-away exterior rearview mirror assembly that exhibits increased stiffness and, therefore, improves the vibration characteristics of the exterior rearview mirror assembly. Furthermore, there is a need for a break-away device that can be molded in a single process along with the housing and the respective bracket to simplify the tooling, which will ultimately reduce the cost of manufacture.

SUMMARY OF THE INVENTION

Accordingly the present invention provides an improved exterior rearview mirror assembly, especially suited for mounting on a vehicle. The exterior rearview mirror assembly is pivotally mounted to the vehicle and is adapted to break-away from a normal operating position to a folded position closer to or adjacent the vehicle in event that the mirror assembly strikes or is struck by an object during the use of the vehicle. These functions are provided by a plurality of detent mechanisms which are located remote from the pivot of the mounting bracket and preferably aligned parallel with but spaced from a line which extends through the center of rotation of the pivot.

According to one aspect of the invention, the vehicle exterior rearview mirror assembly includes a housing having a reflective element and a mounting bracket adapted for mounting to a vehicle. The mounting bracket includes a member and a pivot extending between the member and the housing for pivotally mounting the housing to the mounting bracket for folding from a normal operating position to a break-away position. The mounting bracket and the housing have at least one detent assembly for releasably coupling the housing to the mounting bracket. The detent assembly is positioned adjacent to and extends substantially parallel to but spaced from a line extending through a center of rotation of the pivot and extending in the same plane as the member of the mounting bracket.

In one form, the vehicle exterior rearview mirror assembly includes a pair of the detent assemblies. The detent assemblies extend generally parallel to one another and to the line extending through the center of rotation of the pivot on opposite sides of the pivot. In other forms, the mounting bracket has opposed sides on opposite sides of the pivot, and the detent assemblies are positioned adjacent and generally parallel to the opposed sides of the mounting bracket.

In another form, the vehicle exterior rearview mirror assembly includes a pair of the detent assemblies. The mounting bracket has at least a pair of spaced sides on different sides of the pivot. One of the detent assemblies extends generally parallel to one of the spaced sides and to a line extending through the center of rotation of the pivot and spaced from the line extending through the center of rotation of the pivot. The other detent assembly extends generally parallel to the other side of the mounting bracket and to another line extending through the center of rotation of the pivot, with the detent assembly being spaced from the other line extending through the center of rotation of the pivot.

Preferably, the detent assembly includes a recess positioned on one of the mounting bracket and the housing and a projecting member positioned on the other of the mounting bracket and the housing. For example, the recess may comprise an elongate groove, including a groove with a V-shaped cross-section. The recess includes at least one camming surface. In other forms, the projecting member comprises an elongated rib, including an elongated rib with a generally curvilinear bearing surface. Preferably, the recesses are positioned on the mounting bracket, and the projecting members are positioned on the housing.

According to another aspect of the invention, a vehicle exterior rearview mirror assembly includes a housing having a reflective element, an arm portion, and a mounting bracket, which is adapted to mount to a vehicle. The arm portion includes a plurality of projecting members for releasably engaging the mounting bracket. The mounting bracket includes a base, which supports a pivot, with the housing pivotally mounted to the mounting bracket on the pivot. The base includes a closed cross-section defining an upper wall, a lower wall, and first and second opposed side walls. The upper wall includes a plurality of recesses formed therein, with at least two of the recesses being substantially aligned over the side walls. In this manner the recesses are reinforced by the side walls. The projecting members correspond to the recesses and engage the recesses when the housing is in an normal operating position and disengage from the recesses when the housing is in a folded, break-away position.

In one form, the pivot supports a spring, for example a coil spring. The spring urges the projecting members into engagement with the recesses and is partially compressed when the housing is in the normal operating position to urge the projecting members to engage the recesses. When the housing is pivoted to the folded, break-away position, the spring is substantially fully compressed.

In other forms, the mounting bracket includes a mounting flange. The base extends from the mounting flange. First and second recesses of the plurality of recesses extend from a distal end of the base to a portion of the base adjacent the mounting flange. A third recess of the plurality of recesses extends from the distal end of the projecting base to a portion of the projecting base adjacent the pivot, with the third recess being intermediate the first and second recesses. Preferably, the third recess is generally parallel to the first and second recesses.

As will be understood, the exterior rearview mirror assembly of the present invention provides numerous advantages over prior known mirror assemblies. The exterior rearview mirror assembly provides a break-away feature, which protects the mirror assembly from the damage in the event that the mirror assembly is impacted during the use of the vehicle, and yet provides adequate stiffness to form a stable mirror assembly. The exterior rearview mirror assembly exhibits increased dampening and, therefore, also exhibits improved vibration characteristics, while also providing a consistent stable, break-away force over the life of the assembly. Furthermore, the position of the detent mechanisms are located in the line of draw of the tooling, which simplifies the molding process, saving time and costs.

These and other objects, advantages, purposes and features of the invention will become more apparent from the study of the following description taken in conjunction of the drawings.

BRIEF DESCRIPTION OF THE DRAWINGS

FIG. 1 is a perspective view of an exterior rearview mirror assembly of the present invention installed on a vehicle door;

FIG. 2 is an enlarged perspective view of the exterior rearview mirror assembly;

FIG. 3 is a perspective view of a mounting bracket of the exterior rearview mirror assembly of FIG. 2 showing a preferred arrangement of the detent assembly recesses of the present invention;

FIG. 4A is a plan view of a second embodiment of the mounting bracket showing a second preferred arrangement of the detent assembly recesses of the present invention;

DESCRIPTION OF THE PREFERRED EMBODIMENTS

Figure 4:
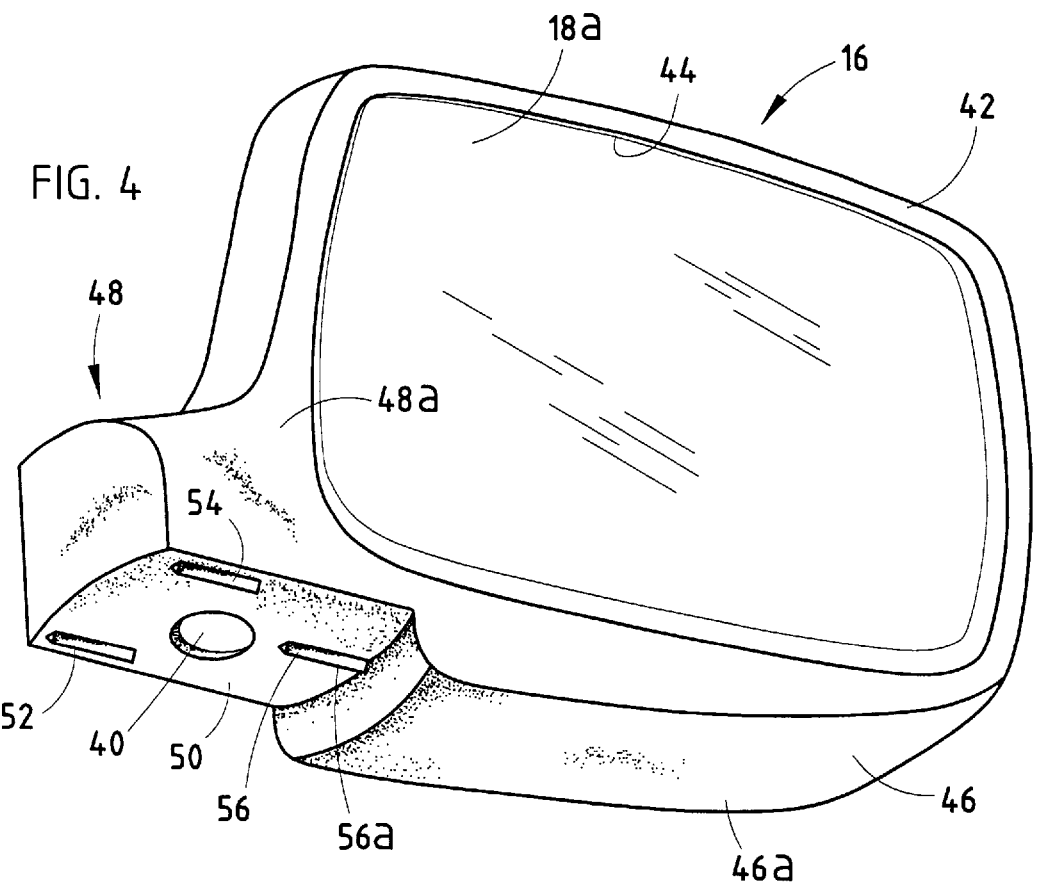
FIG. 4 is a perspective view of a mirror housing of the exterior rearview mirror assembly of FIG. 2 showing a preferred arrangement of the detent assembly ribs or projections corresponding to the recesses of FIG. 3.

Referring to FIG. 1, an exterior rearview mirror assembly 10 of the present invention is shown mounted to a panel 12 of a vehicle 14. Rearview mirror assembly 10 includes a housing 16, which supports a reflective element assembly 18, and a mounting bracket 20. Housing 16 and mounting bracket 20 include a plurality of detent assemblies 21 (FIG. 5) which provide a break-away function for mirror assembly 10, as will be more fully discussed.

Housing 16 is preferably a modular housing molded from a plastic material and, more preferably, a polypropylene or glass filled nylon material. Reflective element assembly 18 includes a reflective mirror element 18a and a backing plate 18b, which supports the reflective mirror element 18a in housing 16. Reflective element 18a may comprise a conventional reflective element formed from glass or plastic with a chrome alloy or other reflective layer on its first or second surface. Alternately, reflective element 18a may comprise a variable reflectance, electro-optic mirror element, such as an electrochromic cell.

Mounting bracket 20 also is preferably molded from a plastic or nylon material and, more preferably, a glass filled polypropylene or glass nylon filled material. Mounting bracket 20 pivotally mounts housing 16 to panel 12 of vehicle 14 and is preferably mounted to panel 12 by conventional methods, such as fastening by a pair of threaded studs or fasteners, which pass through the panel and are secured thereto by nuts. Alternatively, bracket 20 may be secured within the window frame of one of the front windows of the vehicle. When struck or impacted, detent assemblies 21 release and housing 16 separates from mounting bracket 20 along line 19 such that it folds either forwardly or rearwardly about an axis 64 toward the vehicle 14. Further details of detent assemblies 21 follow below.

Figure 5:
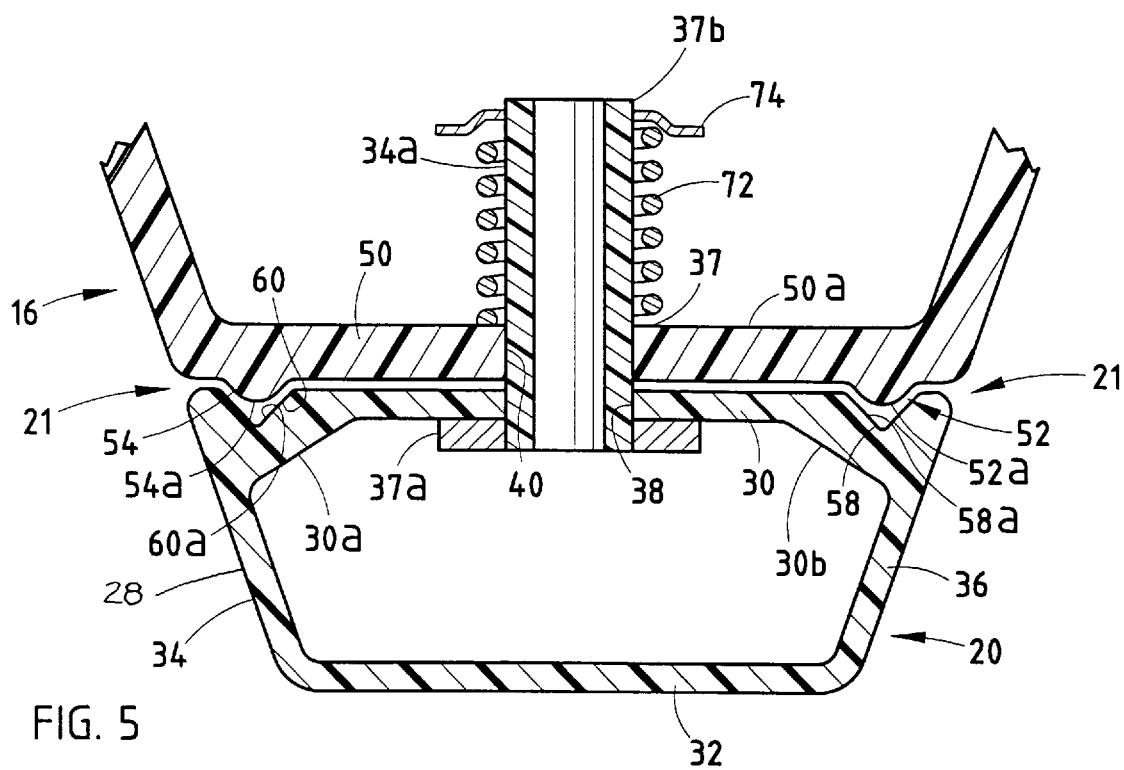
FIG. 5 is a cross-section taken along line V—V of FIG. 2 of one form of the ribs or projections and recesses of the detent assemblies.

As best seen in FIGS. 2 and 3, mounting bracket 20 includes a mounting flange 22 and a mounting base 24. Mounting base 24 projects from mounting flange 22 and comprises a generally "L" shaped member having a first leg portion 26 formed generally integral with mounting flange 22 and a second leg portion 28 which projects outwardly and generally orthogonal to leg portion 26. Referring to FIG. 5, leg portion 28 has generally a closed, hollow tubular member having an upper or top wall 30, a lower or base wall 32, and oppose side walls 34 and 36 which are molded integrally in one piece. Extending upwardly from mounting bracket 20 is a pivot or pivot bushing 37 which extends through an opening 38 provided in upper wall 30 and through an opening 40 provided in housing 16 to thereby pivotally mount housing 16 on mounting bracket 20. Pivot bushing 37 preferably comprises a metal bushing, but may comprise a plastic or other suitable materials. As best seen in FIG. 5, pivot 37 includes an enlarged end 37a which abuts against the lower surface of top wall 30 and retains pivot bushing 37 in mounting bracket 20.

Referring to FIG. 4, housing 16 includes a continuous housing wall 42 having a top, bottom, and opposing ends wall portions which define a rearward opening 44, in which reflective element assembly 18 is positioned, and a base portion 46 projecting from the bottom wall. A mounting arm portion 48 projects from the end portion of housing wall 42 and or recessed includes an interface wall 50, which is offset or recessed above a lower surface 46a of base portion 46. In this manner, when housing 16 is mounted on pivot 37 and positioned in a normal operating position, outer surface 48a of arm portion 48 is generally continuous or flush with the outer surface 26a of leg portion 26 and with side walls 34 and 36 of leg portion 28, and lower surface 46a of base portion 46 is generally continuous or flush with a lower or base wall 32 of leg portion 28. Therefore, when positioned in its normal operating position housing 16 and mounting bracket 20 form a modular assembly with smooth aerodynamic contours.

Detent assemblies 21 preferably each include a recess formed on one of the housing 16 and mounting bracket 20 and a projection or projecting member formed on the other of the housing 16 and mounting bracket 20 and releasably couple housing 16 to mounting bracket 20. In the illustrated embodiment, recessed wall 50 of arm portion 48 includes a plurality of projections or projecting members 52, 54, and 56 which are substantially parallel to each other to form one part of detent assemblies 21. Horizontal leg 28 of mounting base 24 includes a plurality of corresponding recesses 58, 60, and 62, which are similarly substantially parallel with each other to form the other component of detent assemblies 21. Furthermore, projections 52 and 54 and recesses 58 and 60 are substantially parallel with and spaced from a line 63 that extends through the center of rotation of pivot 37. Line 63 lies in the plane of leg portion 28.

As best seen in FIGS. 3 and 5, grooves 58 and 60 are spaced from opening 38 and are positioned on opposite sides of pivot 37 along sides 76 and 78 of leg portion 28. In the illustrated embodiment, sides 76 and 78 of leg portion 28 are substantially parallel and are similarly positioned on opposite sides of pivot 37. Furthermore, recesses 58 and 60 are preferably located on portions of upper wall 30 that are reinforced by side walls 34 and 36 (FIG. 5). As will be more fully described below, the location of detent assemblies near the reinforced sections of the mounting bracket provides several advantages.

When housing 16 is mounted on mounting base 20 and positioned in its normal operating position and pivot bushing 37 is extended through openings 38 and 40, projecting members 52, 54, and 56 are seated or positioned in recesses 58, 60, and 62 and are adapted to fix housing 16 on mounting base 20 about pivot axis 64. Referring to FIG. 5, when pivot bushing 37 extends into housing 16, pivot bushing 37 extends through opening 40 and projects above an upper side 50a of recessed wall 50 of housing 16. In order to fix the position of housing 16 with respect to mounting bracket 20, pivot bushing 37 includes a metal or plastic spring 72 mounted on end portion 37a of pivot bushing 37. Spring 72 is positioned between a stop 74, such as a lockwasher, which is mounted on the distal end portion 37b of bushing 37, and upper surface 50a of wall 50 such that spring 72 is partially compressed. In this manner, spring 72 urges recessed wall 50 toward wall 30, and projecting members 52, 54, and 56 fully seat in and engage recesses 58, 60, and 62, respectively, to form the break-away function for housing 16.

Referring again to FIG. 5, projecting members 52, 54, and 56 preferably comprise elongate ribs each having a rounded or curvilinear free end or bearing surface 52a, 54a, and 56a, respectively. Recesses 58, 60, and 62 preferably each comprise an elongate groove having a generally V-notched shaped cross-section, which provide a pair of opposed camming surfaces 58a, 60a, and 62a. Recesses 58 and 60 extend from distal end 24a of base 24 to a portion of base 24 adjacent mounting flange 22. Recess 62, on the other hand, which is intermediate recesses 58 and 60, extends from distal end 24a to a portion of base 24 adjacent opening 38.

In this manner when an eccentric, external force is applied to housing 16 the bearing surfaces 52a, 54a, and 56a of projecting members 52, 54, and 56 engage and translate along camming surfaces 58a, 60a, and 62a of recesses 58, 60, and 62, respectively, moving housing 16 along axis 64 away from mounting bracket 20. As housing 16 translates along axis 64, recessed wall 50 of housing 16 compresses spring 72. When the applied force is sufficient to compress spring 72 the full extent of the engagement between projecting members 52, 54, and 56 and recesses 58, 60, and 62, projecting members 52, 54, and 56 fully disengage from recesses 58, 60, and 62 and housing 16 pivots about axis 64 and, thus, folding to its breakaway position.

By locating and aligning the detent assemblies 21 over or near side walls 34 and 36, and at least over the transition sections 30a and 30b between wall 30 and the respective side walls 34 and 36, the stiffness of the mirror assembly is increased, and the mirror assembly exhibits increase dampening and consistent break-away force. Consequently, the vibration of the mirror assembly is reduced. Furthermore, by locating recesses 58 and 60 remotely from opening 38, and likewise by locating projecting members 52 and 54 remotely from opening 40, the moment arm is increased. As a result, for the same spring force, the resulting break-away force is increased. Or in the alternative, to achieve the same break-away force, the spring constant of the spring may be reduced. Moreover, by forming projecting members 52, 54, and 56 and recesses 58, 60, and 62 generally parallel with each other and along the line of draw of the tooling, the molding process is simplified-requiring only a single step molding process.

Figure 6:
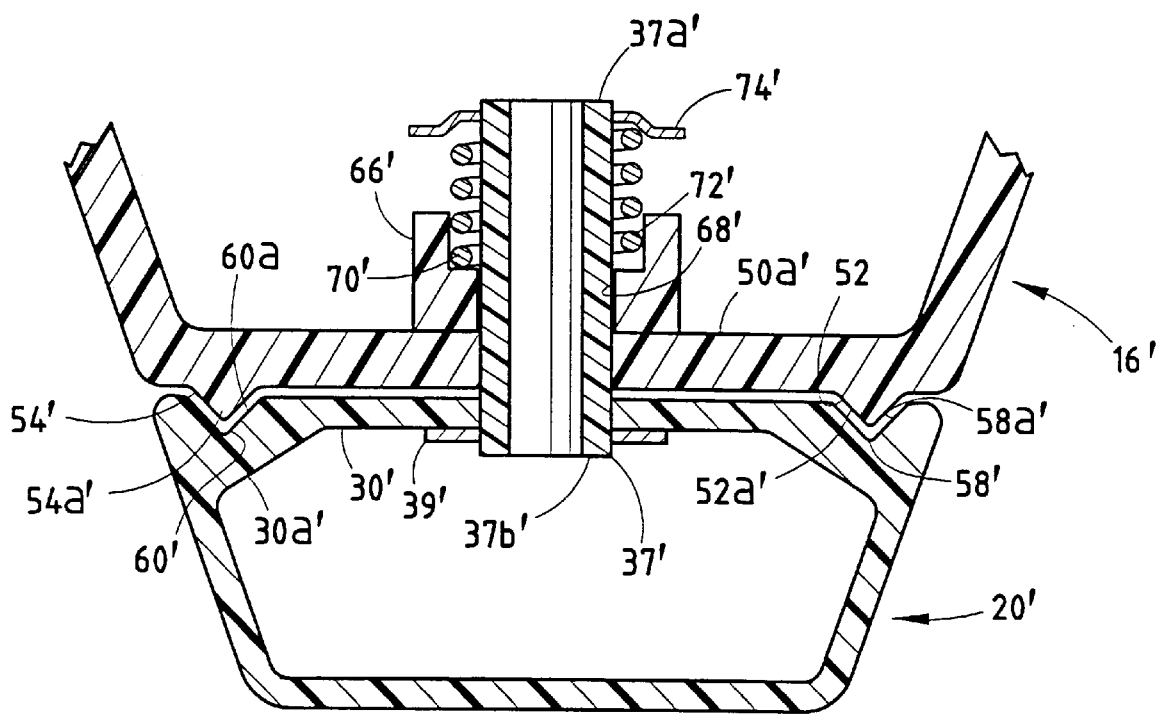
FIG. 6 is an enlarged cross-section view similar to FIG. 5 of another embodiment of the ribs and recesses of the detent assemblies.
Figure 7:
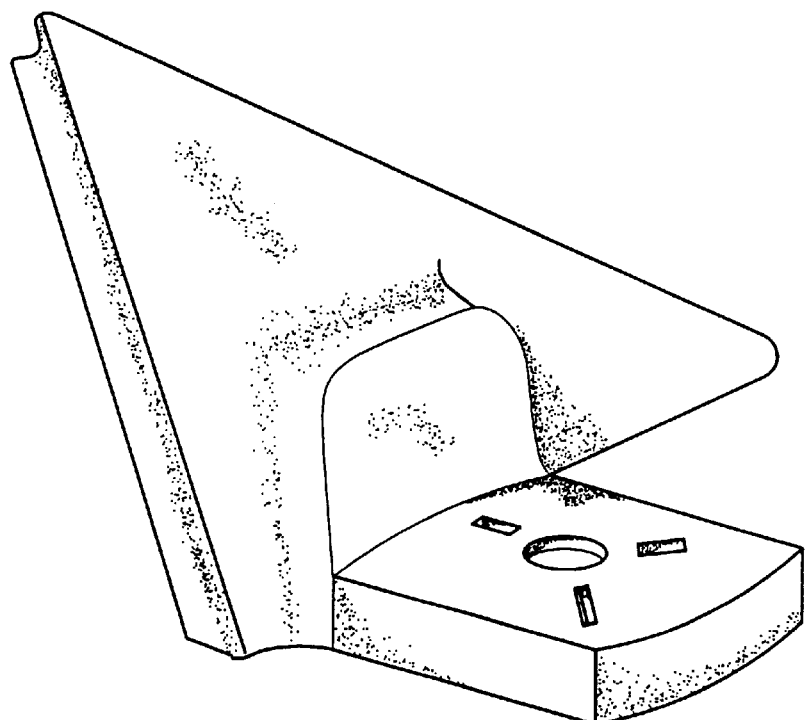
FIG. 7 is a perspective view of a prior art mounting bracket for a rearview mirror assembly illustrating a conventional radial arrangement of recesses for detent assemblies.

Referring to FIG. 6, a second embodiment 16' of the housing is shown. Housing 16' includes a recessed wall 50' with a plurality of projections 52', 54', and 56' and a collar 66', which extends from an upper side 50a' of recessed wall 50'. Housing 16' is pivotally mounted to mounting bracket 20' on pivot bushing 37'. Pivot bushing 37' extends through an opening 38' provided in a top wall 30' of mounting bracket 20' and through an opening 40' provided in recessed wall 50' of housing 26'.

Pivot bushing 37' extends between mounting bracket 20' and housing 16' and extends into collar 66'. Pivot bushing 37' is retained in collar 66' by a spring 72' and lockwasher 74', which is releasably secured to distal end 37a' of pivot 37', and retained in mounting bracket 20' by a second lockwasher 39', which is releasably secured to distal end 37b' of pivot bushing 37' Collar 66' includes a stepped passageway 68', which defines a shoulder 70'. In order to fix the position of housing 16' with respect to mounting bracket 20', spring 72' is interposed between lockwasher 74' and shoulder 70' of collar 66' and is slightly compressed to urge recessed wall 50' toward top wall 30' of mounting bracket 20' and projections 52', 54', and 56' into engagement with corresponding recesses 58', 60', and 62' provided on upper wall 30' of mounting bracket 20' to provide the break-away function for housing 16'.

In the illustrated embodiment, projections or projecting members 52', 54', and 56' comprise elongate ribs having sharp V-shapes with pointed distal ends 52a', 54a', and 56a', which define a pair of camming surfaces. Recesses 58', 60', and 62' preferably comprise V-shaped notches or grooves each having opposed camming surfaces 58a', 60a', 62a', which guide projecting members 52', 54', and 56' and housing 16' along the pivot axis 64' of pivot bushing 37' when an eccentric, external force is applied to housing 16' that is sufficient to compress spring 72'. Similar to the first embodiment, projections 52', 54' and recesses 58', 60' are substantially parallel to each other and are generally parallel to and spaced apart from a line which extend through the center of rotation of the pivot axis 64'. Projection 56' and recess 62' are located intermediate projections 52', 54' and recesses 58', 60', respectively.

In this manner, housing 16' and mounting bracket 20' operate in a similar manner to the first embodiment to provide a break-away mirror assembly. Furthermore, housing 16' and mounting bracket 20' are also preferably a plastic or nylon material and, more preferably, a glass filled polypropylene or glass filled nylon material.

Referring to FIG. 4A, a second embodiment 120 of mounting bracket is shown. Mounting bracket 120 includes a mounting flange 122 and a mounting base 124. Mounting base 124 projects from mounting flange 122 and comprises a generally "L" shaped member having a first leg portion 126 formed generally integral with mounting flange 122 and a second leg portion 128 which projects outwardly and generally orthogonal to leg portion 126. Leg portion 128 has an upper or top wall 130, a lower or base wall 132, and oppose side walls 134 and 136 which are molded integrally in one piece. Extending upwardly from mounting bracket 120 is a pivot or pivot bushing (not shown) which extends through an opening 138 provided in upper wall 130 for pivotally mounting a housing on mounting bracket 120.

In the illustrated embodiment second leg portion 128 is a truncated triangular shaped member and includes sides 176 and 178 on opposite sides of opening 138 which are angled with respect to a first line 163 which extends through a center of rotation of the bushing and which bisects the leg portion 128 into two generally equal parts. It should be understood that other similar shaped leg portions may be used. Similar to previous embodiments, leg portion 128 includes detent assembly recesses 158, 160 and 162, with recesses 158 and 160 being substantially parallel to sides 176 and 178 of leg portion and which cooperate with similarly positioned projections (not shown) on a housing (also not shown). At the same time recesses 158 and 160 are each parallel with and spaced apart from second and third lines 163a and 163b, respectively, which extend through the center of rotation of the pivot. Recess 162, which is intermediate recesses 158 and 160, extends from a distal end 124a of the leg portion along line 163 and terminates at a portion of base 124 adjacent opening 138.

Similar to the first embodiment, recesses 158, 160, and 162 each preferably comprises an elongate groove having a generally V-notched shaped cross-section, which provide a pair of camming surfaces 158a, 160a, and 162a. Moreover, recesses 158 and 160 are preferably located over portions of wall 130 which are reinforced by side walls 134 and 136 to provide greater support for the detent assemblies.

It should be understood from the foregoing that the exterior rearview mirror assembly of the present invention provides a more stable mirror assembly. Furthermore, for the same spring constant, the mirror assembly increases the break-away force, which is required to move housing 16 from its normal operating position to a folded, break-away position adjacent the vehicle. In addition, the projecting members and recesses are preferably positioned in the line of draw of the molding tool and, therefore, can be molded with simple tooling and can be formed without a separate slide action.

Furthermore, while various forms of the invention have been shown and described, other forms are being apparent to those skill in the art. For example, the projections and recesses may be reversed, with the projections being formed on the mounting bracket and the recesses being formed on the housing. In addition, the housing and mounting brackets may be molded from other materials, including die cast zinc alloy or other die cast alloys. Moreover, the specific details of the housing and the mounting brackets and their respective component parts may be varied. The embodiment of the invention shown in the drawings is not intended to limit the scope of the invention which is defined by the claims which follows.

The embodiments of the invention in which I claim exclusion property or privilege are defined as:

1. A vehicle exterior rearview mirror assembly comprising:
   a housing having a reflective element; and
   a mounting bracket adapted for mounting to a vehicle, said mounting bracket including a member extending in a plane and a pivot extending between said member and said housing, said pivot having a center of rotation, said housing being pivotally mounted to said mounting bracket on said pivot for folding from a normal operating position to a break-away position, said mounting bracket and said housing having at least one detent assembly for releasably coupling said housing to said mounting bracket, said detent assembly being positioned adjacent to and spaced from a line extending in said plane of said member and through said center of rotation of said pivot, and said detent assembly including an elongated groove having a longitudinal extent extending generally parallel to said line.

2. A vehicle exterior rearview mirror assembly according to claim 1, wherein said at least one detent assembly comprises a first detent assembly, said mounting bracket and said housing further including a second detent assembly, each of said first and second detent assemblies including an elongate groove having a longitudinal extent extending generally parallel to one another and said line on opposite sides of said pivot.

3. A vehicle exterior rearview mirror assembly according to claim 2, wherein said mounting bracket has opposed sides on opposite sides of said pivot, said grooves of said first and second detent assemblies being positioned adjacent and extending generally parallel to said opposed sides.

4. A vehicle exterior rearview mirror assembly according to claim 1, wherein said at least one detent assembly comprises a first detent assembly, said mounting bracket and said housing further including a second detent assembly, said mounting bracket having at least a pair of spaced sides on different sides of said pivot, said groove of said first detent assembly extending generally parallel to one of said spaced sides, said groove of said second detent assembly extending generally parallel to another of said spaced sides and to another line extending in said plane and through said center of rotation of said pivot, and said groove of said second detent assembly being spaced from said other line extending through said center of rotation of said pivot.

5. A vehicle exterior rearview mirror assembly according to claim 1, wherein said detent assembly includes said elongate groove positioned on one of said mounting bracket and said housing and a projecting member positioned on the other of said mounting bracket and said housing.

6. A vehicle exterior rearview mirror assembly according to claim 5, wherein said elongate groove includes one of a U-shaped cross-section and a V-shaped cross-section.

7. A vehicle exterior rearview mirror assembly according to claim 6, wherein said groove includes a V-shaped cross-section.

8. A vehicle exterior rearview mirror assembly according to claim 5, wherein said groove includes at least one camming surface.

9. A vehicle exterior rearview mirror assembly according to claim 5, wherein said projecting member comprises an elongated rib.

10. A vehicle exterior rearview mirror assembly according to claim 9, wherein said elongated rib includes a generally curvilinear bearing surface.

11. A vehicle exterior rearview mirror assembly according to claim 5, wherein said groove is positioned on said mounting bracket, and said projecting member is positioned on said housing.

12. A vehicle exterior rearview mirror assembly according to claim 1, wherein at least one of said mounting bracket and said housing comprise one of a glass filled nylon material and a polypropylene material.

13. A vehicle exterior rearview mirror assembly comprising:

a housing including a reflective element and having an arm portion, said arm portion including a plurality of projecting members; and a mounting bracket adapted to mount to a vehicle, said mounting bracket having a base, said base supporting a pivot, said housing being pivotally mounted to said mounting bracket on said pivot, said base including a closed cross-section defining an upper wall, a lower wall, and first and second opposed side walls connecting said upper and lower walls, said upper wall including a plurality of recesses formed therein, at least two of said recesses being substantially aligned over said side walls, and said projecting members corresponding to said recesses and engaging said recesses when said housing is in a normal operating position and disengaging from said recesses when said housing is in a folded, break-away position.

14. A vehicle exterior rearview mirror assembly according to claim 13, wherein said pivot supports a spring, said spring urging said projecting members into engagement with said recesses and being partially compressed when said housing is in said normal operating position and being substantially fully compressed when said housing is pivoted to said folded, break-away position.

15. A vehicle exterior rearview mirror assembly according to claim 14, wherein each of said recesses comprises an elongate groove.

16. A vehicle exterior rearview mirror assembly according to claim 15, wherein each of said grooves includes a V-shaped cross-section, said V-shaped cross-section providing a pair of camming surfaces.

17. A vehicle exterior rearview mirror assembly according to claim 16, wherein each of said projecting members comprises an elongate rib.

18. A vehicle exterior rearview mirror assembly according to claim 17, wherein each of said elongate ribs includes a generally curvilinear bearing surface for seating in said grooves and for engaging and being guided by said camming surfaces to disengage from said mounting bracket when an external force is applied to said housing having a sufficient magnitude to compress said spring.

19. A vehicle exterior rearview mirror assembly according to claim 13, wherein at least one of said mounting bracket and said housing comprises one of a glass filled nylon material and a polypropylene material.

20. A vehicle exterior rearview mirror assembly according to claim 14, wherein said mounting bracket includes a mounting flange, said base extending from said mounting flange, said at least two recesses extending substantially parallel to and spaced apart from a line extending through a center of rotation of said pivot.

21. A vehicle exterior rearview mirror assembly according to claim 20, wherein a third recess of said plurality of recesses extends from a distal end of said base to a portion of said base adjacent said pivot, and said third recess being intermediate said first and second recesses.

22. A vehicle exterior rearview mirror assembly according to claim 21, wherein said third recess is generally parallel to said at least two recesses.

23. A vehicle exterior rearview mirror assembly according to claim 21, each of said recesses comprises an elongate groove.

24. A vehicle exterior rearview mirror assembly according to claim 23, wherein each of said grooves includes a V-shaped cross-section.

25. A vehicle exterior rearview mirror assembly according to claim 23, wherein each of said projecting members comprises an elongate rib.

26. A vehicle exterior rearview mirror assembly comprising:

a housing including a reflective element and having at least first, second, and third elongated projecting members, said second projecting member being intermediate said first and third projecting members; and a mounting bracket adapted to mount to a vehicle, said mounting bracket including a base and supporting a pivot on said base, said housing being pivotally mounted to said mounting bracket on said pivot, said base including an upper wall, a lower wall, and first and second opposed side walls connecting said upper wall and said lower wall, said upper wall including first, second, and third elongate grooves formed therein, said second elongate groove being intermediate said first and third elongate grooves, each of said grooves being substantially parallel with the other of said grooves, said projecting members corresponding to said grooves and engaging said grooves when said housing is in a normal operating position and disengaging from said grooves when said housing is in a folded, break-away position.

27. A vehicle exterior rearview mirror assembly according to claim 26, wherein said mounting bracket further includes a mounting flange, said base extending from said mounting flange and including a distal end, said first and third elongate grooves extending from said distal end of said base to a portion of said base adjacent said mounting flange.

28. A vehicle exterior rearview mirror assembly according to claim 26, wherein said first and third grooves are substantially aligned over said first and second side walls, respectively.

29. A vehicle exterior rearview mirror assembly according to claim 26, wherein each of said grooves includes a V-shaped cross-section.

30. A vehicle exterior rearview mirror assembly according to claim 26, wherein each of said projecting member comprise an elongated rib.

31. A vehicle exterior rearview mirror assembly according to claim 26, wherein at least one of said mounting bracket and said housing comprise one of a glass filled nylon material and a polypropylene material.

32. A vehicle exterior rearview mirror assembly according to claim 26, wherein said pivot includes a spring mounted thereon, said spring being biased to urge said projecting members into engagement with said grooves to releasably couple said housing to said mounting bracket and hold said housing in said normal operating position, said housing pivoting on said mounting base when an external force is applied to said housing having sufficient magnitude to compress said spring.

33. A vehicle exterior rearview mirror assembly according to claim 32, wherein said spring comprises a coil spring.

34. A vehicle exterior rearview mirror assembly according to claim 32, wherein said first and third grooves extend substantially parallel to and spaced apart from a line extending through a center of rotation of said pivot.

\* \* \* \* \*

UNITED STATES PATENT AND TRADEMARK OFFICE
CERTIFICATE OF CORRECTION

PATENT NO.    : 5,949,591
DATED         : September 7, 1999
INVENTOR(S)   : Peter J. Whitehead It is certified that error appears in the above-identified patent and that said Letters Patent is hereby corrected as shown below:

Column 1,
Line 57, "breakaway" should be -- break-away --

Signed and Sealed this

Fourth Day of January, 2005

JON W. DUDAS
*Director of the United States Patent and Trademark Office*